(12) United States Patent
O'Donnell et al.

(10) Patent No.: US 6,650,248 B1
(45) Date of Patent: Nov. 18, 2003

(54) PROGRAMMING A UNIVERSAL REMOTE CONTROL DEVICE

(75) Inventors: Eugene M. O'Donnell, Fishers, IN (US); Lori Rene Bolduc, Westfield, IN (US)

(73) Assignee: Thomson Licensing, S.A., Boulogne-Billancourt (FR)

(*) Notice: Subject to any disclaimer, the term of this patent is extended or adjusted under 35 U.S.C. 154(b) by 0 days.

(21) Appl. No.: 09/471,074

(22) Filed: Dec. 22, 1999

(51) Int. Cl.[7] .............................................. G08C 19/00
(52) U.S. Cl. ............................ 340/825.69; 340/825.72; 386/83
(58) Field of Search ...................... 340/825.37, 825.57, 340/825.69, 825.72, 568.1, 693.1; 348/563, 734, 731; 386/83

(56) References Cited

U.S. PATENT DOCUMENTS

| | | | |
|---|---|---|---|
| 4,623,887 A | | 11/1986 | Welles, II .............. 340/825.69 |
| 4,626,848 A | * | 12/1986 | Ehlers .................... 340/825.69 |
| 4,728,949 A | * | 3/1988 | Platte et al. ........... 340/825.37 |
| 4,769,643 A | | 9/1988 | Sogame ................. 340/825.69 |
| 4,866,434 A | | 9/1989 | Keenan ................. 340/825.72 |
| 5,081,534 A | * | 1/1992 | Geiger et al. .......... 340/825.69 |
| 5,410,326 A | | 4/1995 | Goldstein .............. 340/825.72 |
| 5,818,127 A | * | 10/1998 | Abraham ............... 340/310.07 |
| 5,822,123 A | | 10/1998 | Davis et al. ................... 725/43 |
| 6,055,244 A | * | 4/2000 | Wall, Jr. et al. ............ 370/487 |

FOREIGN PATENT DOCUMENTS

| | | |
|---|---|---|
| EP | 0639030 | 2/1995 |
| EP | 0957636 | 11/1999 |
| WO | 94/03017 | 2/1994 |

OTHER PUBLICATIONS

Search Report for PCT Appln. No. PCT/US00/33728 dated Mar. 5, 2001.

\* cited by examiner

*Primary Examiner*—Van Trieu
(74) *Attorney, Agent, or Firm*—Joseph S. Tripoli; Robert D. Shedd; Reitseng Lin

(57) ABSTRACT

A method, apparatus, and system for allowing a user to program a universal remote control transmitter device by presenting interactive display menus or voice prompts within a first synchronized remote controllable appliance such as a television, whereby a user can easily program the remote control device to control desired types, brands, and models of additional, different appliances.

10 Claims, 1 Drawing Sheet

PROGRAMMING A UNIVERSAL REMOTE CONTROL DEVICE

BACKGROUND OF THE INVENTION

This invention relates to the field of universal remote control devices and associated remote controllable appliances.

Universal remote control devices (URC) are widely used to control more than one remote controllable appliance from a single unit, rather than having a separate remote controller for each appliance. Frequently the manufacturer of a device, apparatus or appliance such as a television, video cassette recorder, or digital video disk player, for example, will include a URC with the appliance, and provide instructions as to how to program the URC to control additional appliances, especially when the additional appliances are of a different brand. To program the URC to control additional appliances the user generally must use a paper look-up table in the instruction book, or follow the written instructions which sometimes instruct the user to use a liquid crystal display (LCD) or other display on the URC during the programming process. Frequently the user will lose the instruction booklet, and at other times will have difficulty following the written instructions which, of necessity, are often complicated due to the complexity of programming many possible brands and models of several types of appliances.

SUMMARY OF THE INVENTION

According to the present invention, a method and apparatus are provided which allow a user to program the URC by following menus displayed on or voice synthesized by a remote controllable appliance, such as a TV, VCR, or other remote controllable appliance which can generate display or voice. Some benefits of this technique are that it allows the user to get visual feed-back from the display or audio feedback from the voice generator to make the URC programming process easier. The invention allows easy programming even if the instruction book is misplaced, can save the need for printing instructions by the manufacturer, and avoids the necessity of manufacturing an LCD display on the URC.

DETAILED DESCRIPTION OF THE PREFERRED EMBODIMENT

Figure 1:
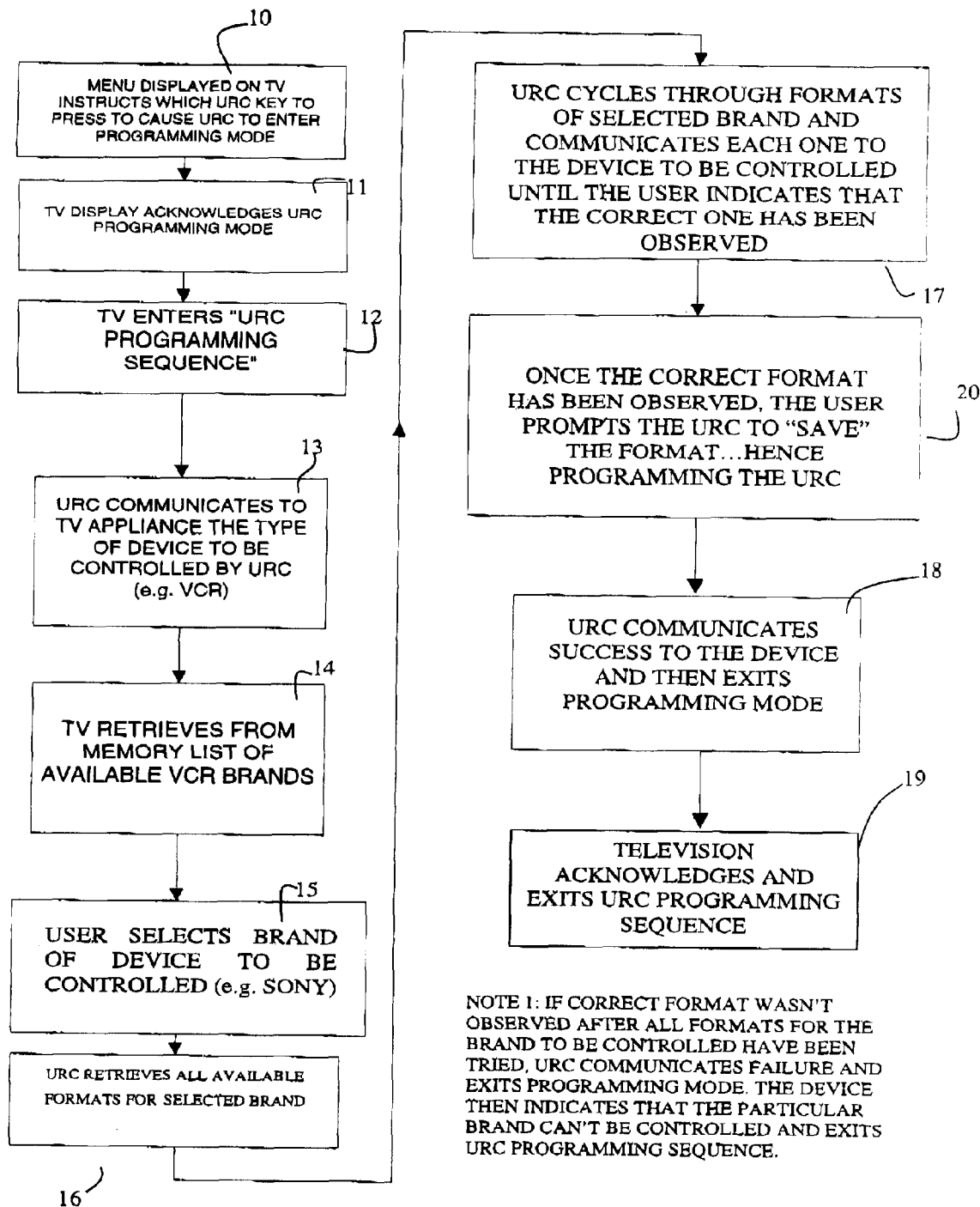
FIG. 1 is a block diagram of the logic of the URC.

While this embodiment will be illustrated for a television which has a display on which menus are displayed, the menus can be communicated to the user by sound such as by synthesized voice.

Referring to FIG. 1, in the Set-up menu of the a remote controllable appliance, exemplified herein by a television, a menu item 10 provided, for example, displayed, to a user. Pressing the appropriate button on the URC leads to a menu, which says, for example, "Press and hold the device key for the device you want to control." For URC's which are designed with a single toggle key or a mechanical switch to choose the appliance type, appropriate instructions would be displayed on the TV as to how to cause the URC to enter the program mode for a desired type of appliance, e.g., for VCR's. After the user selects an appliance the URC enters the "program" mode and also transmits a signal, e.g., IR code, to the television to close the loop and activate the next menu. The TV displays an acknowledgement 11 that the URC programming routine has been entered successfully and the TV enters its URC routine 12 for the selected device, for example, VCRs (see routine 13). The next menu (routine 14) may prompt the user to select the brand of the VCR by navigating through a list of possible VCR brands. For example, the routine may include the following:

What letter does your brand name start with?
1—A–C
2—D–F
3—G–I
4—J–L
5—M–O
6—P–R
7—S–U
8—V–X
9—Y,Z
0—Exit
Press 'Clear' to start over.

Key presses other than numeric or 'clear' are ignored by the TV. If a numeric is pressed, the appropriate code is sent to the television. If the 'clear' key is pressed, the 'clear' code is sent, and the URC returns to the 'normal' mode. There must be a time-out for each screen.

Upon receipt of code indicating a number, the television calls up 14 from memory a list of available VCR brands that start with the selected letters, for example "A through C", and the following television screen would say, for example:

---

Select your brand name:
1 - Axxxxx
2 - Ayyyyy
3 - Azzzzz
4 - A . . .
9 - More
0 - Exit
Press 'Clear' to start over
Press 'Go Back' to back up

---

This process continues until an unambiguous brand name is selected 15.

Once the brand has been selected, the URC sends a confirmation of the sequence of codes back to the receiver, which acknowledges with an ON SCREEN DISPLAY message. For example, 'you have selected a Sony brand VCR.

It may also be necessary to select a sub-code type, as various suppliers can use different codes due to historical and cross-branding considerations. This can be selected by a menu-guided method, as above. If there is ambiguity with the brand name, the acknowledgement screen would say, You have selected a RCA brand VCR
You will need to try a few formats of code. 17
(Or the television display may retrieve 16 available formats for the selected type and brand of appliance.)
Please press the key indicated and check if the device responds (eg. 'play' for a VCR, or channel up for a cable box).
To indicate the correct code, press and hold that key for 3 seconds Once an unambiguous code is found, an "acknowledge" code is sent to the television by the URC. The television may prompt the user to save the selected format 20. The URC may then signal success to the television, causing the television to exit the programming mode 18, which may be acknowledged by the television, and which may cause the television to exit the interactive routine 19.

It is obviously necessary that the programming algorithm for the URC must be 'synchronized' with the menu content in the receiver, The code look-up table is based on "seeing" the sequence of key presses described by the display.

The following example is an embodiment wherein the first appliance is a VCR and the URC is being programmed to control a TV as the different appliance. Once URC program mode is entered and TV is selected as the appliance to be programmed into the URC, the menu or voice may say:

```
"Select the brand of the TV to be controlled:
00 RCA
01 Sony
 .
 .
 .     >> Entry for all brands that can be controlled.
xx Zenith
Press and hold the TV key
Enter the 2 digit code that corresponds to the brand selected."
```

The URC could then send a message to the VCR to advance to the next screen or voice menu, which might say "To verify that the URC will operate your TV, press VOLUME UP or DOWN (the most popular code for the brand selected would be programmed). If the TV responded, press OK on the URC."

In response to the signal received from the URC, the VCR would clear the on-screen display (OSD) and present the message, for example, "If the TV did not respond, press CH UP to advance to the next code."

The URC would advance to the next most-popular table for the brand selected and repeat the verification process.

Once the URC has advanced through all of the tables for the brand selected, a code could be sent to the VCR to display a message that all codes for the brand selected have been tried.

While this invention has been described in detail and exemplified with respect to the best mode of carrying it out, various other embodiments, alternatives, and improvements should become readily apparent to those skilled in this art without departing from the spirit and scope of the invention.

What is claimed is:

1. A method for programming a universal remote control device comprising the steps of:
   providing a first remote controllable appliance having a display or voice synthesizer and a hand held universal remote control transmitter device which is pre-programmed to control said first remote controllable appliance and which may be programmed by a user to control additional appliances of a plurality of types, brands, and models;
   providing the first appliance with a remote control programming mode comprised of a plurality of menus which are provided to a user in response to key press signals received from the universal remote control device and which guide a user in programming the universal remote control device to control additional appliances; and wherein
   a first one of said plurality of menus provides a selection list of types of appliances;
   a second one of said plurality of menus provides a selection list of brand names of the type of appliance selected; and
   a third one of said plurality of menus provides a selection list of model numbers of appliances of the selected brand name.

2. Method of claim 1 wherein the first remote controllable appliance having a display or voice synthesizer comprises a microprocessor programmed to provide said plurality of menus.

3. Method of claim 1 wherein said first remote controllable appliance and said additional appliances are selected from the group consisting of televisions, video cassette recorders, cable boxes, high fidelity sound systems, satellite decoders, digital video disc players, and DBS receivers.

4. Method of claim 1 wherein upon successful programming of said universal remote control transmitter device to control an additional appliance, display or voice information is generated by the first remote controllable appliance and/or the universal remote control transmitter device which confirms said successful programming.

5. An apparatus comprising
   a universal remote control transmitter device and
   a first remote controllable appliance having a display or voice synthesizer and a remote control programming mode comprised of a series of selection menus which are displayed or voice generated in response to key press signals received from the universal remote control transmitter device,
   the universal remote control transmitter device pre-programmed to control said first appliance and programmable by a user to control one or more additional appliances by pressing keys in response to said selection menus provided by said first appliance; and wherein
   said series of selection menus of said first remote controllable appliance includes listings of appliance types, brand names, and models.

6. Apparatus of claim 5 wherein said universal remote control transmitter device is voice activated.

7. Apparatus of claim 5 wherein said first appliance generates prompts which guide a user through a step by step interactive procedure to program said transmitter device to control said one or more additional appliances.

8. Apparatus of claim 5 wherein said first and additional appliances are selected from the group consisting of televisions, video cassette recorders, cable boxes, high fidelity sound systems, satellite decoders, digital video disk players, and DBS receivers.

9. A system for programming a universal remote control transmitter device comprising providing a first remote controllable appliance having a display or voice synthesizer and a hand held universal remote control transmitter device which is pre-programmed to control said first remote controllable appliance and which may be programmed by a user to control additional appliances of a plurality of types, brands, and models;
   the first appliance having a remote control programming mode comprised of a series of menus adapted to guide a user in programming the universal remote control transmitter device to control additional appliances, the menus being displayed or voice generated in response to key press signals received from the universal remote control transmitter device; and wherein
   the menus provided by said first appliance present selection choices of types of appliances, brands within the types, and models within the brands.

10. Apparatus of claim 9 wherein pressing a key on the remote control transmitter device signals the first appliance as to the selected types, brands, and models and also functions to program the remote control transmitter device.

* * * * *